United States Patent [19]

Vold et al.

[11] Patent Number: 4,627,658
[45] Date of Patent: Dec. 9, 1986

[54] POWER-ASSISTED SEMI-TRAILER TRUCK BODY TOP COVER

[75] Inventors: Donald J. Vold, Pottsville, Pa.; Saul R. Spector, Hallandale, Fla.; Anthony J. Piller, Schuylkill Haven, Pa.; Hilda M. Vold, legal representative of said Donald J. Vold, deceased

[73] Assignee: Set Manufacturing Co., Pottsville, Pa. ; a part interest

[21] Appl. No.: 584,601

[22] Filed: Feb. 29, 1984

[51] Int. Cl.⁴ .............................................. B60P 7/02
[52] U.S. Cl. .................................... 296/100; 49/346; 105/377
[58] Field of Search ....................... 296/100, 101, 181; 105/377; 220/1 T, 1 V, 211; 49/340, 346

[56] References Cited

U.S. PATENT DOCUMENTS

| | | | |
|---|---|---|---|
| 3,195,744 | 7/1965 | Wender | 296/101 X |
| 3,481,371 | 12/1969 | Row | 296/100 X |
| 3,667,161 | 6/1972 | Sassano | 49/346 X |
| 3,861,737 | 1/1975 | Kirkbride | 296/100 |
| 4,023,857 | 5/1977 | Killion | 296/100 X |
| 4,210,358 | 7/1980 | Sweet et al. | 296/100 |
| 4,302,044 | 11/1981 | Sims | 296/100 X |

FOREIGN PATENT DOCUMENTS

| | | | |
|---|---|---|---|
| 2351558 | 4/1975 | Fed. Rep. of Germany | 296/101 |
| 2931111 | 2/1981 | Fed. Rep. of Germany | 296/181 |
| 0153423 | 12/1979 | Japan | 296/100 |
| 197709 | 9/1977 | U.S.S.R. | 49/346 |

Primary Examiner—Robert B. Reeves
Assistant Examiner—Russell D. Stormer

[57] ABSTRACT

An open-top trailer body hinged top cover comprising two longitudinal half-frame sections is disclosed in which powered rotating arms having rollers set in tracks which form the cabside ends of half-frames each covering half of the trailer body opening such that when the arms rotated the half-frames will open or close by the rollers moving along the tracks and the rollers will slidably adjust to correct misalignment and ensure closure.

4 Claims, 7 Drawing Figures

POWER-ASSISTED SEMI-TRAILER TRUCK BODY TOP COVER

BACKGROUND OF THE INVENTION

1. The Field of the Invention

The field of the invention pertains to powered top coverings for open-top semi-trailer truck bodies and means for operating them.

2. Description of the Prior Art

The prior art discloses a variety of devices for enclosing open-top semi-trailers of the transfer type. It must be understood, by way of introduction, that debris carrying open-top semi-trailers, or those carrying loose commodities, are now subject to federal, state, and municipal statutes, laws or regulations which prohibit their uncovered use in transport on roads and highways, in order to prevent debris or loose contents from flying out onto the roads, thereby creating hazards to traffic and polluting the environment with such debris. Almost universally coverings are mandated by law or regulation to prevent this.

Early efforts disclose the use of tarpaulin coverings which are stretched over the trailer body top opening and tied down to posts or eyes provided on the walls of the body. This is time-consuming and inconvenient for the loader and provides limited access to the semi-trailer through the top, a circumstance which is frequently confronted. Stretching coverings across half-frames which are sectionally installed on hinges and optionally joined to each other along the trailer top are also known. These are manually swung open or closed by poles or crooks which are carried on the sides of the trailer or undercarriage. The disadvantages of this type of cover are that the poles become lost; the person loading is put to substantial inconvenience fitting the pole to a section-end to swing it open or closed (often having to climb over parts of the trailer or tractor to gain access to the section where it is attached), with the problem of manual tie-down remaining, albeit confined to fewer points for tying. The frames, by their elongated nature, are subject to misalignment and distortion because the swing is uncontrolled and depends on gravity.

Opening or closing the cover frames by manually operated, chain driven gear mechanisms which drive the hinged ends of the frames to get the opening/closing swing are also known in the art. See Exhibit "A" in the patented file showing a product of such design of Anji Manufacturing, Inc. The disadvantages of such means are the physical effort required of the loader, the inherent physical danger and discomfort of using a chain by hand and the stowage in a safe place of the chain so that it does not become free and capable of doing damage. A further disadvantage is that the gear mechanism directly drives the member of the frame about which the cover rotates. The mechanism applies severe torque to the frame, is cumbersome and is located inconveniently on the trailer body. Also, the free, or inboard end, of the frame is unsupported and the frame is subject to substantial distortion when moved. Power means applied to chain-driven closures are also known. These obviously reduce physical fatigue and eliminate some hazard, but the disadvantages of no support to the free end of the frame, a cumbersome, unsafe arrangement, and severe torque at the wrong place remain. Additionally, the frames are difficult to stop in mid-cycle with any precision which is also a disadvantage in loading or removal. Another type of powered apparatus for opening and closing frames is known wherein the inboard cabside corner of the frame is provided with an outwardly mounted stop which is struck and contacted by a free end of an arm rotated by a motor and the swing motion imparted to the frame thereby allows it to rise under power and fall by gravity to the open or closed position. The impact of free-fall causes severe distortion to the frame and there is no option provided to permit partial opening or closure. Although no literature is available to Applicants, upon information and belief, Ace Manufacturing Company of California produces such an apparatus.

The present invention eliminates all of the disadvantages recited above by providing powered rotating arms and rollers in continuous assembly and contact with tracks which form inboard transverse edges of the frames, permitting precise, positive opening and closing with interim semi-open positions possible, support for the frames at all times, and also provides complete operator safety and convenience, with novel, built-in means to allow for compensation of misalignment of the frames to ensure complete closure.

Other numerous advantages over the prior art and novel and unique features of the present invention are described in detail below.

SUMMARY OF THE INVENTION

The present invention discloses pairs of tubular metal half-frames mounted by hinge means to the tops of the side walls of open-top transfer semi-trailer bodies. The half-frames are conventionally covered with debris arresting means and are operated in their opening and closing by new and novel power driven rotating arms attached to slidably adjusting rollers set in semi-enclosed tracks or channels which form the cabside edges of, and provide support to, the frames and provide continuous control of their movement. The arm rotation is supplied by powered shaft rotation as, for example, by means of a hydraulic motor. Such a configuration provides substantial mechanical advantage to the raising and lowering of the half-frame by applying pressure to the point on the frame most requiring it, based upon its position. Additionally, freedom of the pin on which the roller is mounted inside the track, to slide perpendicularly to the longitudinal axis of the arm allows the half-frame to align and overlap itself on closure with its opposite partner thereby ensuring more complete coverage of the trailer top opening. Further advantages are provision by the arm and track of support to the half-frame at its unhinged end, positive stopping of the opening/closing swing at any point along the arc, remote operator location (i.e., inside the tractor cab) to effectuate the covering action and compactness. Other and further advantages will occur and appear to those ordinarily skilled in the art as they read the specification.

DESCRIPTION OF DRAWINGS

The present invention may be better understood and its numerous objects and advantages will become apparent in those ordinarily skilled in the art by reference to the drawings wherein seven (7) figures are shown on three (3) sheets.

DESCRIPTION OF THE PREFERRED EMBODIMENT

Figure 1:
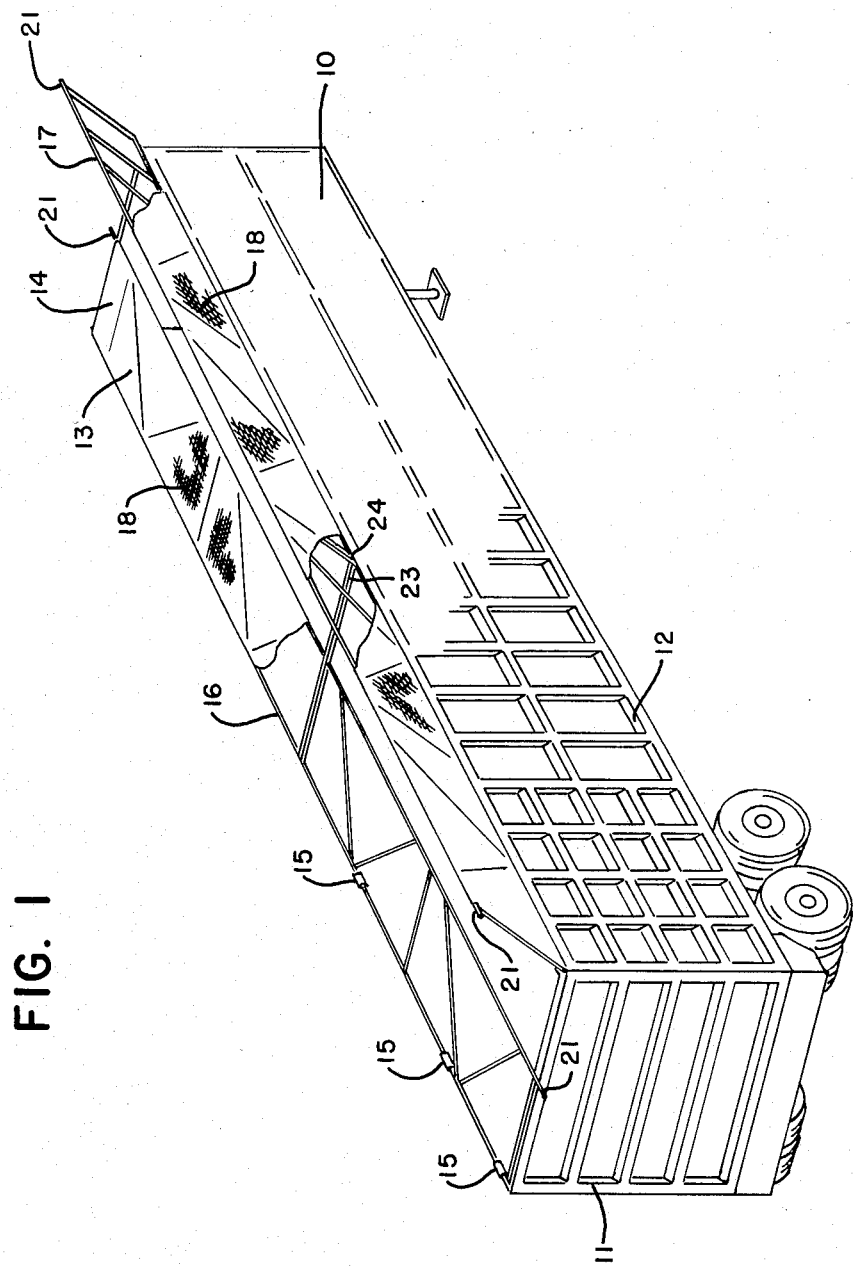
FIG. 1 is a perspective view of an open-top trailer body showing the mounting and general configuration of the half frames both closed and partly open.
Figure 2:
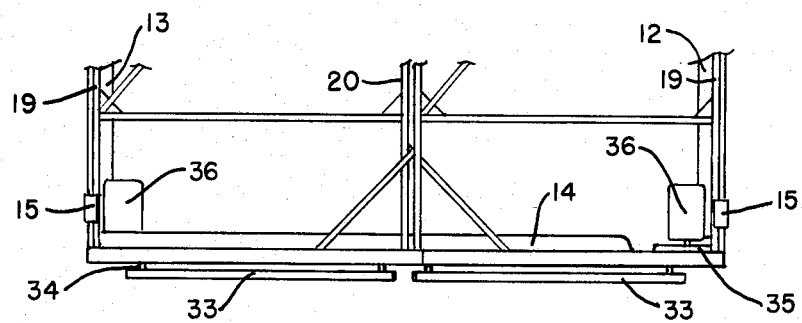
FIG. 2 is a skeletal plan view of the cabside end of an open top trailer body showing the relationship of the rotating arm, the semi-enclosed track on the frame end and a motor.
Figure 3:
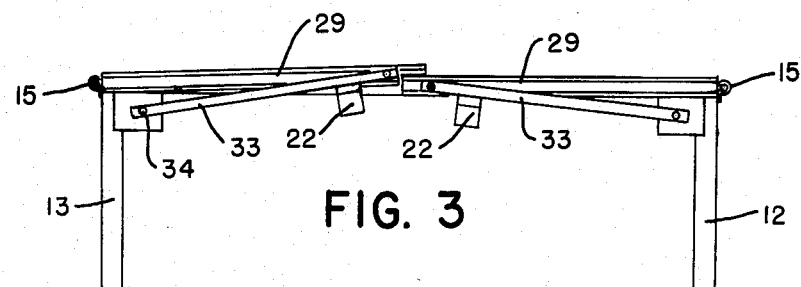
FIG. 3 is a skeletal elevated view of the upper portion of the cabside wall of the trailer body showing the half-frames in the down position.
Figure 4:
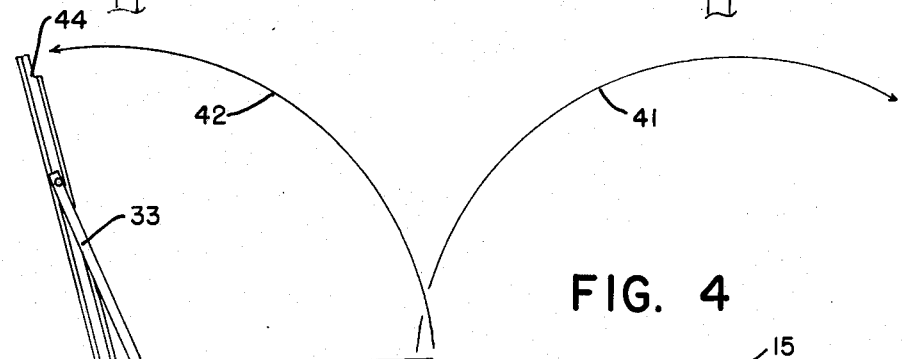
FIG. 4 shows the sequential rotation of the half-frames to accomplish positions partially open and fully open.
Figure 5:
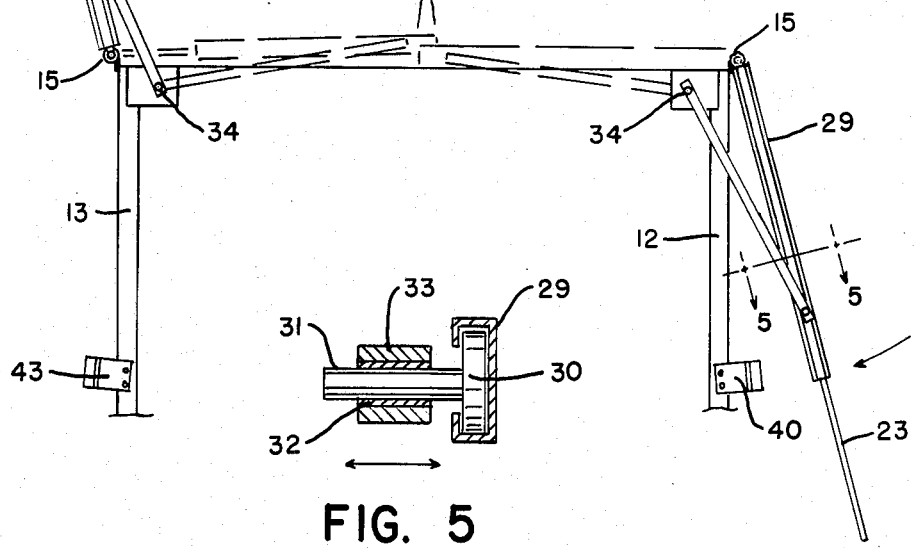
FIG. 5 is a sectional view through "5—5" of FIG. 4 showing the roller assembly and track configuration with the novel slide adjusting feature.
Figure 6:
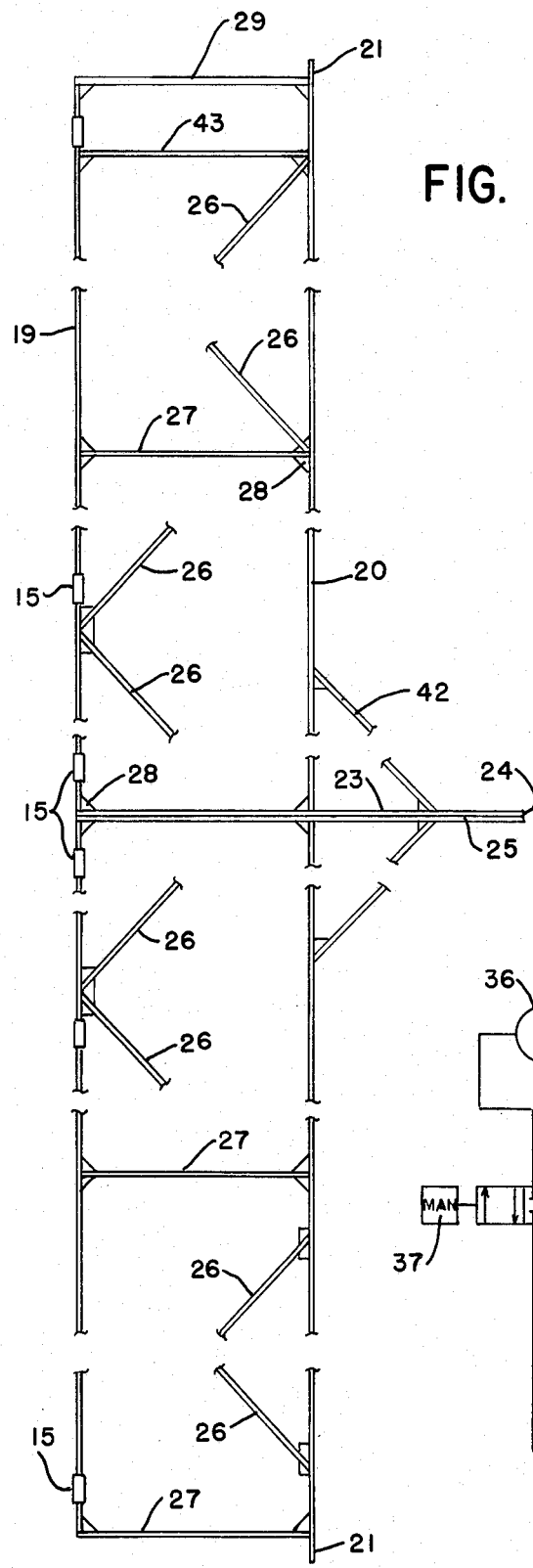
FIG. 6 shows a typical complete roadside tublar half-frame assembly with a debris arresting covering.
Figure 7:
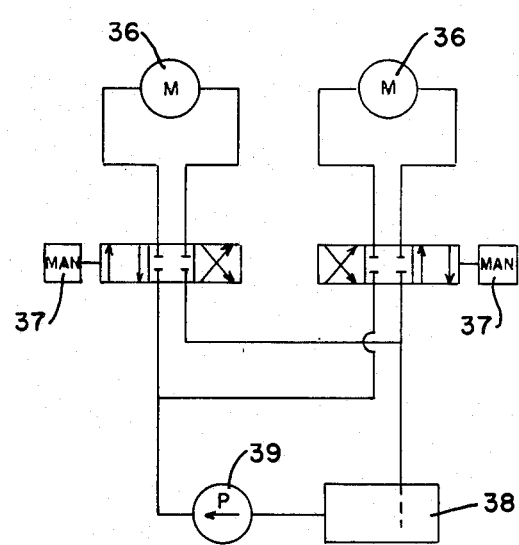
FIG. 7 shows a typical schematic hydraulic network diagram whereby the half-frames may be opened and closed.

A semi-trailer truck body of the open-top type 10 is depicted and oriented so that the transverse, rear wall 11 is shown as is the longitudinal, curbside wall 12. Partially shown is a portion of the longitudinal, roadside wall 13 and the cabside wall 14. Mounted to the wall tops of the curbside and roadside walls by hinge means 15 are a pair of rectilinear, longitudinal, tubular metal half-frames 16, 17 which are covered with debris arresting means 18 of mesh, nylon or the like, such that when the roadside frame is brought down flat onto the open top and the curbside frame is brought down to overlap the roadside frame the trailer body interior becomes fully enclosed.

The roadside half-frame 16 has a first longitudinal member 19 which is essentially of a length equal to that of the top of the longitudinal wall to which it is attached and carries the hinges. A second longitudinal wall to which it is attached and carries the hinges. A second longitudinal, inboard member 20 is somewhat longer than the distance defined between the transverse trailer walls such that overlapping portions 21 of the member can rest on the transverse wall tops and upon roof stops 22 mounted on the transverse walls, when the half-frame is in the closed position. Centrally disposed across the half-frame is a tubular, transverse long member 23 which is of a length equal to that defined between the longitudinal walls such that when the half-frame is in the closed position the end of the transverse member 24 rests upon the top of the curbside wall, thereby giving support to the half-frame at its center to prevent sagging. It will occur to those ordinarily skilled in the art that the half-frame may be constructed in two or more sections which can telescope into each other or otherwise be attached to form an integrally assembled half-frame at its center to prevent sagging. It will occur to those ordinarily skilled in the art that the half-frame may be constructed in two or more sections which can telescope into each other or otherwise be attached to form an integrally assembled half-frame within the spirit of the invention and in so doing create for convenience a multiplicity of centrally disposed transverse members 25. Diagonal 26 and transverse stiffeners 27 are affixed interiorly on the half-frame by gussets 28 thereby making the half-frame, or sections thereof, rigid. The debris arresting means may then be affixed across the entire half-frame conventionally.

The roadside half-frame has for its leading, most cabside, transverse member, a metal track member 29 a semi-enclosed, "C" shaped cross-section mounted such that the open side of the "C" faces cabside.

Slideable fitted into the track is a disc shaped roller 30 rotably mounted on a pin 31 which slidably moves on a bearing 32 set in a front portion of an arm 33 of rectilinear cross section, the rear portion of which is affixed to the shaft 34 of a reducer 35 attached to a hydraulic motor 36 which is controlled by a manual, sequencing switch 37 which controls the flow of hydraulic fluid through a reservoir 38 by pump means 39 to rotate the motor shaft.

The half-frame on the opposite, or curb, side is identically constructed as the roadside half-frame except that the transverse tubular member which is centrally disposed on the frame is the same length as the other curbside transverse tubular members of the half-frame.

In operation, the motor shaft rotation is activated by the switches which may be remotely located as, for example, in the cab of a tractor by conventional hose means to which the semi-trailer is attached. Sequentially, from the closed position, to open the curbside half-frame by means of the arm and roller the arm is rotated outward 42 to an intermediate open position or to full open against a stop 43 mounted to a lower portion of the outer surface of the cabside wall and protruding therefrom such that the half-frame is kept from contact with the curbside wall. Thereafter, the roadside half-frame may be raised, and precautionarily viewed by the switch operator for safety problems created by the extra length of the central transverse member 23 swinging in the roadside area and brought against a stop 40 similarly. To close, the roadside half-frame is rotated upward and inboard of the roadside wall by rotating the roadside arm causing its roller to slide rollably in the track which in turn will cause the half-frame to swing upward about its hinges and inward of the trailer body to the roof stop 22 at the top the cabside wall such that the half-frame is in the closed position and the with the long transverse member resting on the curbside wall. Rotation of the curbside half-frame will cause it to swing overlappingly back over the roadside half-frame thereby enclosing the trailer top. At rest against the transverse walls, any distortion in either half-frame will be compensated for by the sliding action of the roller pin thereby ensuring that the inboard longitudinal half-frame members will seat at each end on the transverse walls and over each other snugly.

In order to ensure that the half-frames lie snugly over each other in the enclosed position it is desirable to notch 44 the curbside half-frame track member at its inboards end. Other improvements of the type will occur to those skilled in the art which will improve rigidity of the half-frames, inter alia, such as a diagonal 45 located inboard of the second longitudinal frame member to support the long central transverse member and an additional transverse tubular member 46 near the track 46.

What is claimed is:

1. A power-driven hinged, sectional semi-trailer truck body roof cover in combination comprising:
   an open top semi-trailer truck body having a transverse cabside wall, a longitudinal, curbside wall, a second longitudinal roadside wall and a transverse rear wall each wall having a top and
   (a) a metal tubular, roadside, longitudinal, tubular member upon which are mounted hinges for attaching the half-frame to the top of the curbside wall of the trailer body, said member's length being essentially equal to that of the top of the sidewall; said half-frame having (1) a second tubular longitudinal member which is longer than the distance which is defined between the transverse walls such that overlapping portions are created at the ends of the second member permitting it to rest on the tops of the transverse walls when the half-frame is rotated inboard on the hinges to rest on the trailer transverse wall tops and such that the half-frame provides cover means to a half of the trailer body top over which it rests, said half-frame also having (2) a long transverse tubular member centrally disposed across the longitudinal members of the half frame and of a length defined by the distance from the first longitudinal member to the outer edge of the side wall opposite; said half-frame also having (3) a metal transverse, extruded member forming the cabside end of the half-frame which member has a "C" shaped cross-section which defines a semi-enclosed track with a longitudinal opening, said transverse member being mounted on the half-frame such that the opening faces cabside and is of a length defined by the distance between the first and second longitudinal members and such that (4) inside the track is slidably and rollably fitted a disc shaped roller, rotably mounted on a pin which is slidably mounted in a bearing in a first end portion of an arm which is of rectilinear cross-section and which is mounted perpendicularly to a longitudinal axis thereof, such that the pin may slide perpendicularly to the longitudinal axis of the arm, the arm further having a second end portion which is affixed perpendicularly to a cabside directed rotatable shaft of a powered rotating means which is mounted on the cabside wall below the top thereof such that when the powered shaft is rotated in one direction the arm will rotate in the same direction and the roller will rollably slide in the track causing the half-frame to rotate in an arc about the hinges and swing up from the trailer body and outward thereof to a position which is determined by stopping the shaft rotation and which provides access to the trailer body portion under the half-frame and such that when the shaft is rotated oppositely the arm will also rotate and the roller will rollably slide in the track in the opposite direction causing the half-frame to close and such that when closed the half-frame will lie flat across a half opening of the trailer body thereby enclosing half of it, and (b) a metal tubular, curbside, longitudinal, rectilinear, open top half-frame, covered with debris arresting means which half frame has a first longitudinal, tubular member upon which are mounted hinges for attaching the half-frame to the top of the remaining, roadside wall of the trailer body, said member's length being essentially equal that of the top of the sidewall; and half-frame having (1) a second tubular, longitudinal member which is longer than the distance which is defined between the transverse walls such that overlapping portions are created at the ends of the second member permitting it to rest overlappingly on the first half-frame when the second half-frame is rotated on its hinges inboard of the trailer open top and such that the second half-frames provides cover means to a remaining half of the trailer body; and second half-frame also having (2) a metal transverse, extruded member forming the cabside end and having a "C" shaped cross-section which defines a semi-enclosed track with a longitudinal opinion, said transverse member being mounted on the half-frame such that the opening faces cabside and is of a length defined by the distance between the first and second longitudinal members of the half-frame said transverse member also having a notch cut into its inboard end such that the half-frame is enabled to seat itself snugly, overlapping and longitudinally alongside the first half-frame, and (3) inside the transverse track member is slidably and rollably fitted a disc shaped roller, rotably mounted on a pin which is slidably mounted in a bearing in a first end portion of an arm which is of rectilinear cross-section and which is mounted perpendicularly to a longitudinal axis thereof such that the pin may slide perpendicularly to the longitudinal axis of the arm, the arm further having a second end portion which is affixed perpendicularly to a cabside directed rotatable shaft of a powered rotating means which is mounted on the cabside wall below the top thereof such that when the powered shaft is rotated it will provide rotable motion to the roadside half-frame identical with that of the curbside half-frame and such that when the power means is activated by sequential switching means, each half-frame may be swung open providing access to the top of the trailer body, or closed, thereby covering the trailer body top opening and arresting debris attempting to escape therefrom.

2. A semi-trailer truck body roof cover as in claim 1, wherein the debris arresting means comprises mesh or woven cloth.

3. A semi-trailer truck body roof cover as in claim 1, wherein the power driving means consists of an electric and hydraulic motor.

4. A semi-trailer truck body roof cover as in claim 3, where the motor is hydraulic.

* * * * *